(12) United States Patent
Datta et al.

(10) Patent No.: US 7,851,943 B2
(45) Date of Patent: Dec. 14, 2010

(54) DIRECT CURRENT POWER TRANSMISSION AND DISTRIBUTION SYSTEM

(75) Inventors: Rajib Datta, Niskayuna, NY (US); Christof Martin Sihler, Hallbergmoos (DE); Richard S. Zhang, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 196 days.

(21) Appl. No.: 11/608,582

(22) Filed: Dec. 8, 2006

(65) Prior Publication Data

US 2008/0284249 A1 Nov. 20, 2008

(51) Int. Cl.
*H02J 3/14* (2006.01)
(52) U.S. Cl. ...................................... 307/38
(58) Field of Classification Search ............ 307/38, 307/36
See application file for complete search history.

(56) References Cited

U.S. PATENT DOCUMENTS

| | | | |
|---|---|---|---|
| 3,968,419 A | 7/1976 | Ekstrom | |
| 4,019,115 A | 4/1977 | Lips | |
| 4,837,671 A | 6/1989 | Wild et al. | |
| 5,311,419 A * | 5/1994 | Shires | 363/65 |
| 6,331,765 B1 * | 12/2001 | Yamamoto et al. | 323/210 |
| 6,559,559 B2 * | 5/2003 | Cratty | 307/64 |
| 6,670,721 B2 | 12/2003 | Lof et al. | |
| 6,751,106 B2 | 6/2004 | Zhang et al. | |
| 7,433,214 B2 * | 10/2008 | Kunow et al. | 363/65 |
| 2006/0126242 A1 | 6/2006 | Datta et al. | |
| 2006/0227578 A1 | 10/2006 | Datta et al. | |

FOREIGN PATENT DOCUMENTS

| | | |
|---|---|---|
| DE | 19847680 A1 | 10/1998 |
| GB | 1420984 | 1/1976 |
| GB | 1520884 | 8/1978 |
| GB | 2397445 A | 7/2004 |
| JP | 11089235 A | 9/2000 |
| JP | 2000245066 A | 9/2000 |
| WO | WO0152379 A2 | 7/2001 |

* cited by examiner

*Primary Examiner*—Jared J Fureman
*Assistant Examiner*—Carlos Amaya
(74) *Attorney, Agent, or Firm*—Patrick K. Patnode (57) ABSTRACT

A direct current (DC) transmission and distribution system includes a system DC link configured for carrying power from a source to a plurality of loads {16} and DC to alternating current (AC) power converter modules coupled in series to the system DC link on a load side of the system DC link

30 Claims, 7 Drawing Sheets

DIRECT CURRENT POWER TRANSMISSION AND DISTRIBUTION SYSTEM

CROSS REFERENCE TO RELATED APPLICATION

This application is being filed concurrently with commonly assigned US patent application No. 11/608,570 which is herein incorporated by reference.

BACKGROUND

The subject matter disclosed herein relates generally to converter topologies useful for direct current (DC) power transmission and distribution.

Transportation of electrical power to oil and gas sub-sea electrical equipment often requires high power being transported over long distances. Transmission for sub-sea equipment is used to supply the power from the onshore utility to the point where the power starts to be distributed among individual loads. At this point, a step down transformer is usually involved to bring the high voltage level of the transmission stage to a lower voltage level for the distribution stage to individual units of the electrical equipment. The distribution distance is typically shorter than the transmission distance, and the associated power and voltage levels to be supplied to individual loads or load clusters is lower than that of the transmission stage. Typically the transmission power is on the order of one hundred megawatts.

For applications wherein bulk power is transmitted over long distances, alternating current (AC) transmission provides technical challenges. Capacitance causes charging current to flow along the length of the AC cable. Because the cable must carry this current as well as the useful load current, this physical limitation reduces the load carrying capability of the cable. Because capacitance is distributed along the entire length of the cable, longer lengths result in higher capacitance and higher resulting charging current. As the cable system design voltage is increased to minimize the line losses and voltage drop, the charging current also increases.

DC transmission can be achieved more efficiently over longer distances than AC transmission. Medium voltage (MV) or high voltage (HV) DC transmission typically requires power electronic converters which are capable of converting between HV AC and HV DC. In conventional converter topologies, each switch of the converter is designed to handle high voltages which may range from tens of kilovolts to hundreds of kilovolts depending upon the application. Such switches are typically arranged with series connection of several semiconductor devices such as insulated gate bipolar transistors (IGBTs) and thyristors.

BRIEF DESCRIPTION

It would be desirable to provide a more reliable and efficient transmission and distribution system.

In one embodiment, a direct current (DC) transmission and distribution system comprises: a system DC link configured for carrying power from a source to a plurality of loads, at least some of the plurality of loads being situated sub-sea; and DC to alternating current (AC) power converter modules coupled in series to the system DC link on a load side of the system DC link.

In another embodiment, a DC transmission and distribution system comprises: a system DC link configured for carrying power from a source to a load; and DC-to-AC power converter modules coupled in series to the system DC link on a load side of the system DC link; and a controller for driving a current of the system DC link toward a commanded value.

In another embodiment, a DC transmission and distribution method comprises: providing a system DC link configured for carrying power from a source to a load; coupling at least two DC-to-AC power converter modules in series to the system DC link on a load side of the system DC link; and driving a current of the system DC link towards a commanded value.

In another embodiment, a DC transmission and distribution method comprises: providing a system DC link configured for carrying power from a source to a load; coupling at least two DC-to-AC power converter modules in series to the system DC link on a load side of the system DC link; and later coupling at least one additional DC to AC power converter module in series to the originally-coupled DC to AC power converter modules or decoupling at least one of originally-coupled DC to AC power converter modules.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
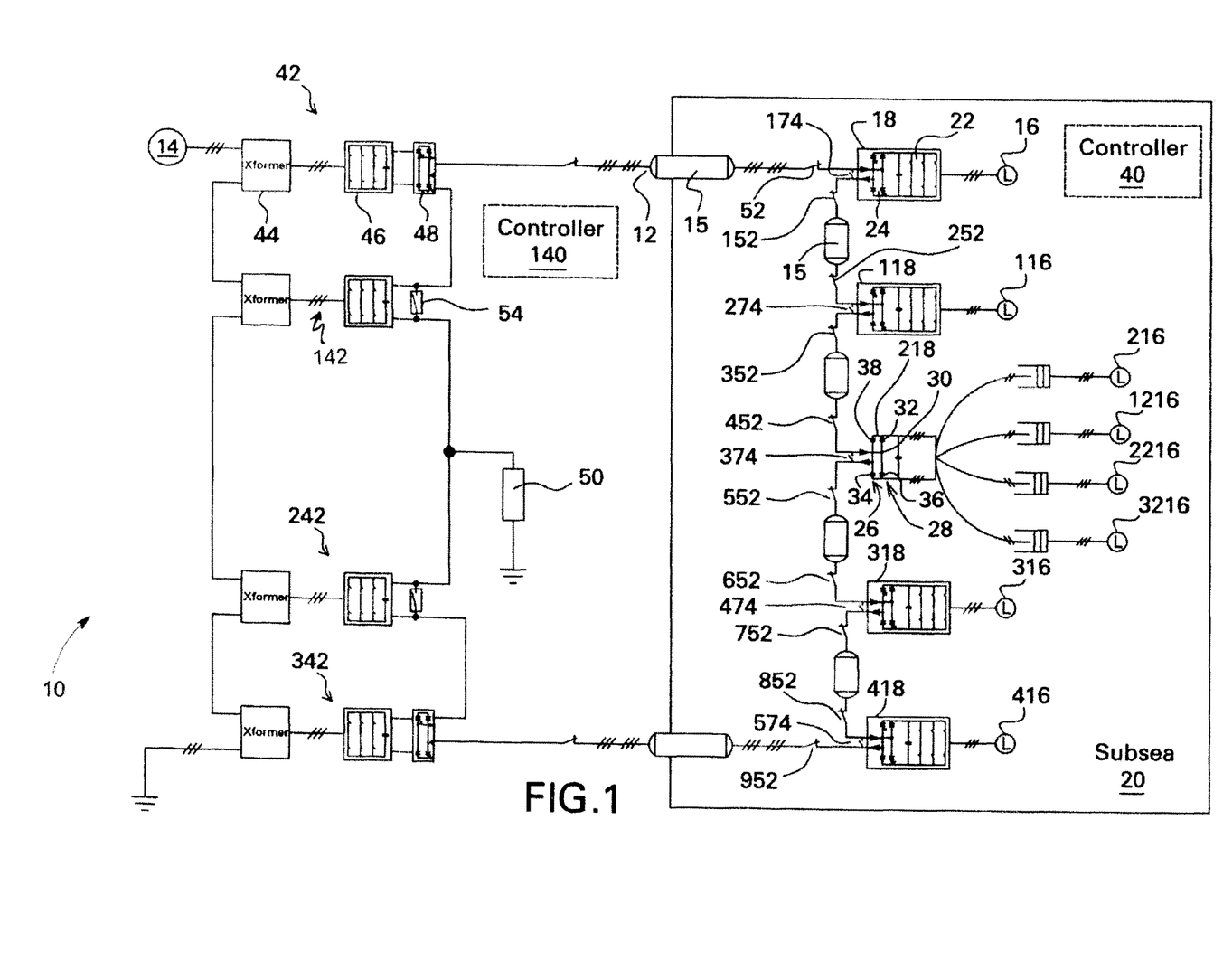
FIG. 1 is a block diagram of one transmission and distribution system embodiment disclosed herein.

FIG. 1 is a block diagram of one embodiment wherein a direct current (DC) transmission and distribution system 10 comprises a system DC link 12 configured for carrying power from a source 14 (meaning at least one source) to a load 16 (meaning at least one load), and DC to alternating current (AC) power converter modules 18, 118, 218, 318, 418 coupled in series to system DC link 12 on a load side of the system DC link.

The embodiment of FIG. 1 is particularly useful for transmitting bulk electrical power from a source to a distant load using DC transmission wherein the DC voltage level is at least medium (for example, at least ten kilovolts). Typically the distances are greater than twenty kilometers but what is considered "distant" will vary depending upon power requirements of the load. Additionally, some applications may exist wherein the benefits of stringing load-side power conversion modules in DC are not dependent upon long distances. In sub-sea embodiments, for example, the source may be at a long distance from the load (for example, on-shore to off-shore transmission for sub-sea loads) or may be at a short distance (for example, transmission to sub-sea loads from a topside platform wherein distance is typically four kilometers to five kilometers). When used to supply power to loads situated in sub-sea 20, the embodiment of FIG. 1 is expected to reduce cost, complexity (number of components such as circuit breakers, transformers, and wet-mateable connectors which may be eliminated or reduced in some aspects of the embodiments disclosed herein, for example), and required space for power conversion equipment.

The power converter modules typically comprise three phase power converters. In a more specific example, the power converters comprise two level converters, three level converters, or a combination of two level converters and three level converters. In other examples, a higher number of levels may be used.

Within the ring formed by system DC link 12, current going into and coming out of each power converter module will always be the same as that supplied from the source side of transmission and distribution system 10. In other words, the source maintains the current on the system DC link. The commanded current on the system DC link is selected to be the minimum needed to support the maximum current required by any one of the power converter modules to supply appropriate power to its respective load or loads. Thus, the transmission and distribution system is most efficient when loads of similar requirements are arranged in the series. A feedback loop can be used to enable a controller 140 to determine the system DC link current command. In one embodiment, controller 140 is also useful for driving the current of the system DC link toward the commanded value. As indicated above, the commanded value will typically depend upon the load requirements and may be adjusted from time to time to adapt to changing requirements. The adjustments are not expected to be substantial as long as the series connected loads have similar nominal currents (with differences in the range of only plus or minus ten percent, for example) and at least one load is in operation.

In one embodiment, in contrast to the DC link current being bounded within a relatively narrow range, the voltage of the system DC link is variable from zero to plus or minus a nominal DC link voltage. In embodiments wherein the DC link current is controlled but the DC link voltage is variable, the series-coupled power converter modules may more easily be short-circuited in the event of a fault. This feature enables the elimination or reduction of DC circuit breakers. The nominal voltage need not be high. For example, in one embodiment, the nominal voltage is less than or equal to plus or minus about ten kilovolts. In another more specific example, the nominal voltage is less than or equal to plus or minus about thirty kilovolts.

Figures 2, 3, 4:
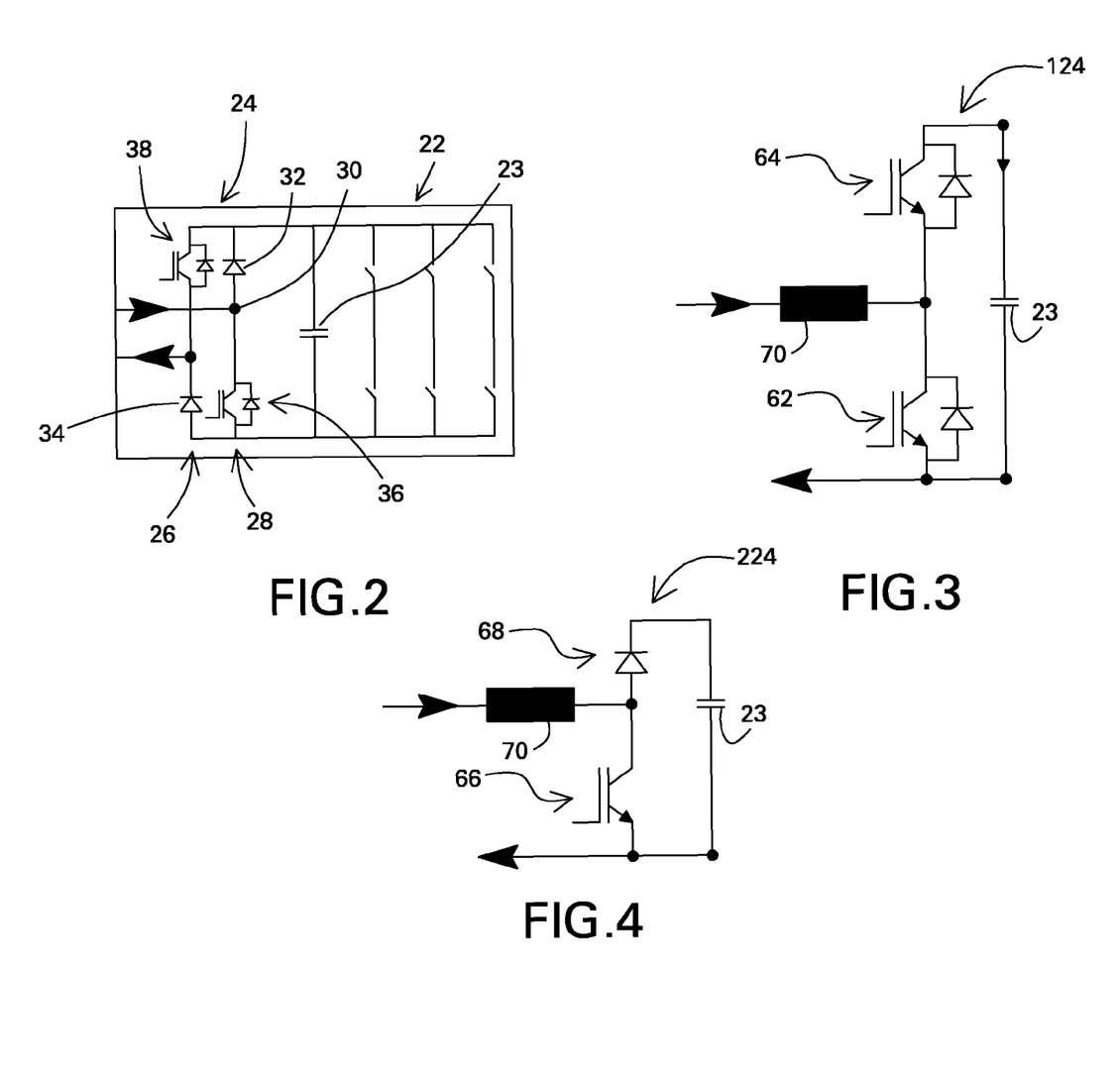
FIG. 2 is a block diagram of one converter embodiment.
FIG. 3 is a block diagram of another converter embodiment.
FIG. 4 is a block diagram of another converter embodiment.

In one embodiment which is useful for providing power converter module bypass capability, as shown in larger view in FIG. 2, each converter module comprises an inverter 22 and a half bridge 24 coupled between system DC link 12 and the inverter. A module DC link 23 couples the half bridge and inverter. Inverter 22 may comprise a conventional conversion module using semiconductor switching devices such as IGBTs, GTOs, or transistors along with associated controls.

In one example, the half bridge comprises an asymmetrical half bridge. The half bridge is used for controlling current to the load, whereas the inverter is used for controlling voltage to the load. The power to the load may be adjusted by controlling the current, the voltage, or a combination of the current and voltage. In an exemplary embodiment, at least one half bridge comprises two diode switch pairs 26 and 28 which each in turn comprise one diode 32 or 34 and one switch 36 or 38. A terminal 30 is configured for receiving input power and supplying the input power to the inverter through diode 32 when both of the switches 36 and 38 are open. Switches 36 and 38 may comprise any appropriate switching devices with several examples including IGBTs (insulated gate bipolar transistors) and GTOs (gate turn off thyristors).

Controller 40 is configured for closing at least one of switches 36 and 38 in the event of a fault condition. For example, if there is a short circuit in module DC link 23 between half bridge 24 and inverter 22, the half bridge can bypass the load (that is, cause the respective power converter module to be in a short circuit condition) and avoid feeding the fault. Controller 40 may comprise one or more computers or processors (which may be situated locally, remotely, or both locally and remotely) configured for sending command signals to switches of the half bridge and inverters, for example, and thus short circuit the DC terminals of the power converter module. If either of switches 36 or 38 is closed (that is, turned "on"), then the power converter module is bypassed meaning that no power is provided through it to any attached load or loads. This short circuiting feature is useful as an alternative to DC circuit breakers which, when used in sub-sea conditions, are typically expensive and complex and may sometimes result in reliability concerns. Another advantage of this embodiment is that a power converter module may independently remain in operation when another (meaning one or more others) of the power converter modules is in a short circuit condition. When one or more power converter modules are bypassed on one side of the system DC link, the resulting system DC link voltage equals to the sum of the remaining half-bridge voltages. Controller 140 automatically adjusts the sum of the half-bridge voltages on the other side of the system DC link in order to keep the DC ring current at a constant value. Thus the total power transmitted to the loads is instantaneously adapted by adapting the system DC link voltage.

By having two switches, there is some redundancy in case one switch fails. Another use for two switches relates to the ability to close both in order to cause a polarity change of the module DC link current. This can be useful for embodiments wherein the power converter module is coupled to a load comprising a motor 416 and wherein the power converter module is desired for controlling electromagnetic braking.

When loads have different current requirements, current that is not required by a load will be bypassed by the respective power converter module and result in some efficiency losses, particularly if there is a large difference between current requirements. The bypass in this example is a partial bypass with the half bridge switches being modulated and the duty ratio being selected to lower the resulting power supplied to the load.

Power load 16 typically comprises a plurality of power loads which are illustrated in FIG. 1 as loads 16, 116, 216, 1216, 2216, 3216, 316, and 416 and which may have similar or different power requirements. Load-side power converter modules may be coupled to respective single loads or, as shown by power converter module 218, may be coupled to a plurality of parallel loads 216, 1216, 2216, and 3216. The parallel load embodiment is particularly useful when the parallel loads have lower power requirements than the single loads. When parallel loads are used, the half bridge controls the common module DC link voltage and the inverters control the currents flowing to the loads 216, 1216, 2216, and 3216.

Although the embodiment of FIG. 2 is useful for providing redundancy and providing the capability to cause a polarity change of the module DC link current, other DC-to-DC converter configurations may alternatively be used, particularly if these features are not desired. For Example, FIGS. 3-4 are block diagrams of other converter embodiments with FIG. 3 illustrating a DC-to-DC converter 124 embodiment with two switches 62 and 64, and FIG. 4 illustrating a DC-to-DC converter 224 embodiment with one switch 66 and one diode 68. FIGS. 3-4 additionally illustrate an inductor 70 which may comprise either a discrete element or be present as a natural inductance in the line and is also typically present (but not shown) in the embodiment of FIG. 2.

Although DC transmission and distribution systems have several advantages over AC systems, DC systems are most commonly used in special applications such as military and research applications. One reason is because energy distribution is typically passed on parallel topologies and a short circuit current in a parallel DC topology would be high and include expensive switchgear to perform interrupt functions. When a DC topology is used in a sub-sea application with a series connection at the load side, a short circuit in a load module or converter may easily be handled by the following process which is discussed with respect to the embodiment of FIG. 5.

Figure 5:
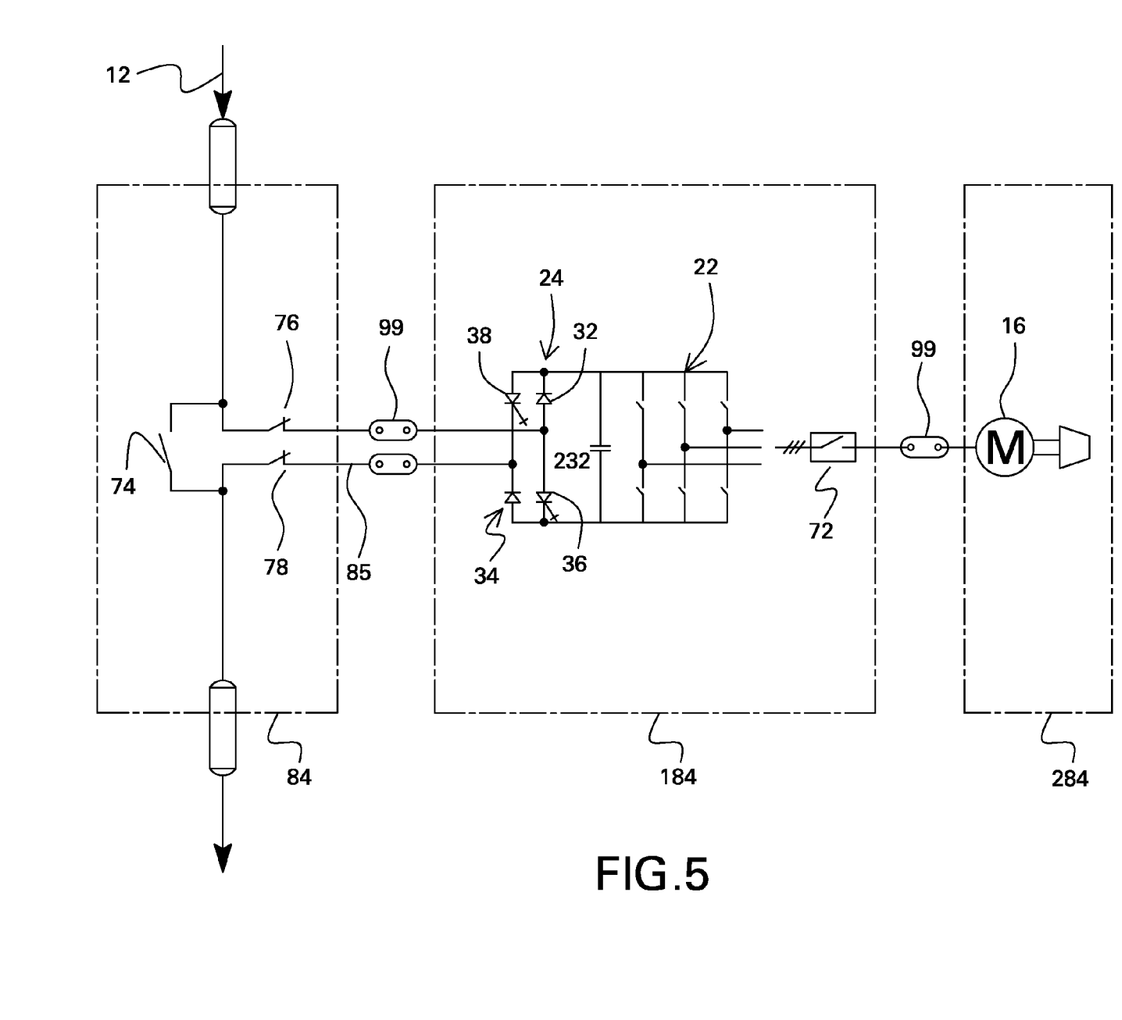
FIG. 5 is a block diagram of a more specific example of a converter embodiment.

FIG. 5 illustrates a subdivision of a load module into three sections with the first section 84 comprising DC switchgear (illustrated by switches 74, 76, and 78, for example), the second section 184 comprising the power conversion components, and the third section 284 comprising an electrical motor 16 with a mechanical load 17 such as a pump or compressor. These sections can be installed in one sub-sea container or in two or three separate sub-sea containers connected by sub-sea cables 85 and connectors 99 in order to facilitate service and maintenance.

In the event of a fault in a load module or converter, one or more of the half-bridge 24 switches 36 and 38 is closed so as to short circuit the load module and thus ensure that the rest of the DC transmission and distribution system is not affected by the fault. In parallel, switches in inverter 22 may be turned off to more quickly isolate the fault. The circuit breaker 72 may be opened to disconnect the load from the power converter module. After this series of switching operations, the only remaining current in the load module will be the system DC link current flowing over the short-circuited half-bridge. In one embodiment, a switch 74 is closed in order to permit the capacitance of module DC link 23 to be discharged, after closing both switches 36 and 38. In this embodiment, the half-bridge is designed to withstand the maximum discharge current for a few milliseconds. Then the switches 36 and 38 may be opened along with switches 76 and 78 at which point the load converter is now completely separated from the load and the DC transmission and distribution system and can be withdrawn for maintenance, repair or replacement while the DC transmission and distribution system stays in operation. Later reinsertion of the converter module is possible by short-circuiting the half-bridge and then opening switch 74.

Figure 6:
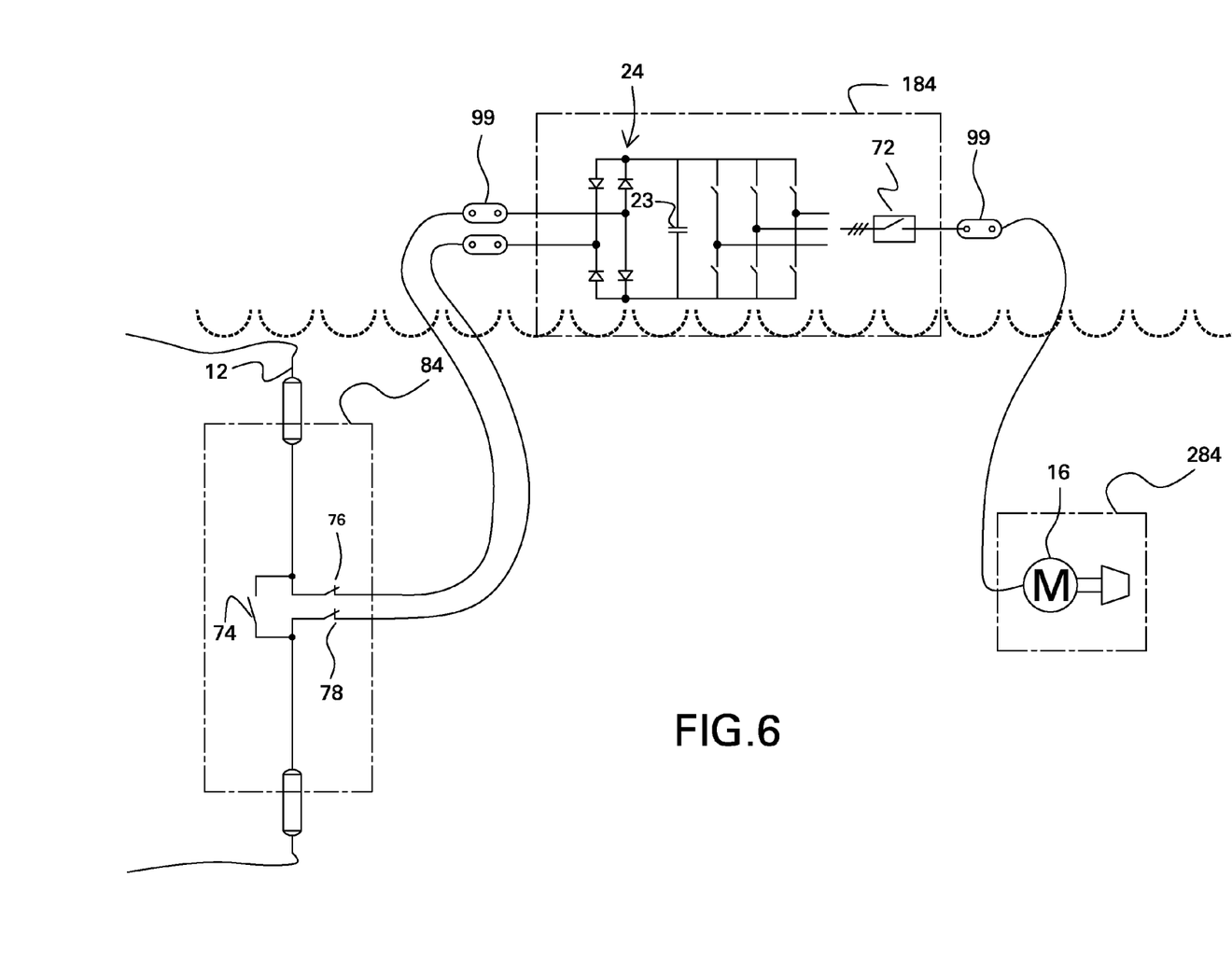
FIG. 6 is a block diagram of a modular redundancy embodiment useful for avoiding wet-mateable connections.

FIG. 6 is a block diagram of a modular redundancy embodiment useful for avoiding wet-mateable connections. Wet-mateable connections are connections made under the sea. It is useful to avoid such connections due to the associated complexity and cost. FIG. 6 is similar to FIG. 5 but further illustrates section 184 being raised above the surface of the sea. If section 184 comprises a compact and light weight housing coupled by sufficiently long cables, section 184 may be lifted out of the sea for maintenance. In one example the housing comprises steel. If the weight of the cables causes difficulty in lifting the housing, floaters may be attached to the cable to reduce the weight. Typically sections 84 and 284 will comprise heavier, fixed sea bed installations. This embodiment is useful because, most of the components in the power conversion system are of low complexity except for those included in section 184. Low complexity components typically have a long operation life, on the order of fifteen years, for example. The components which are most likely to need maintenance or earlier repair are situated in section 184. By using the embodiment of FIG. 6, such components could be serviced without the need to install wet-mateable connectors. In some embodiments, though, wet-mateable connectors may still be used.

Figure 7:
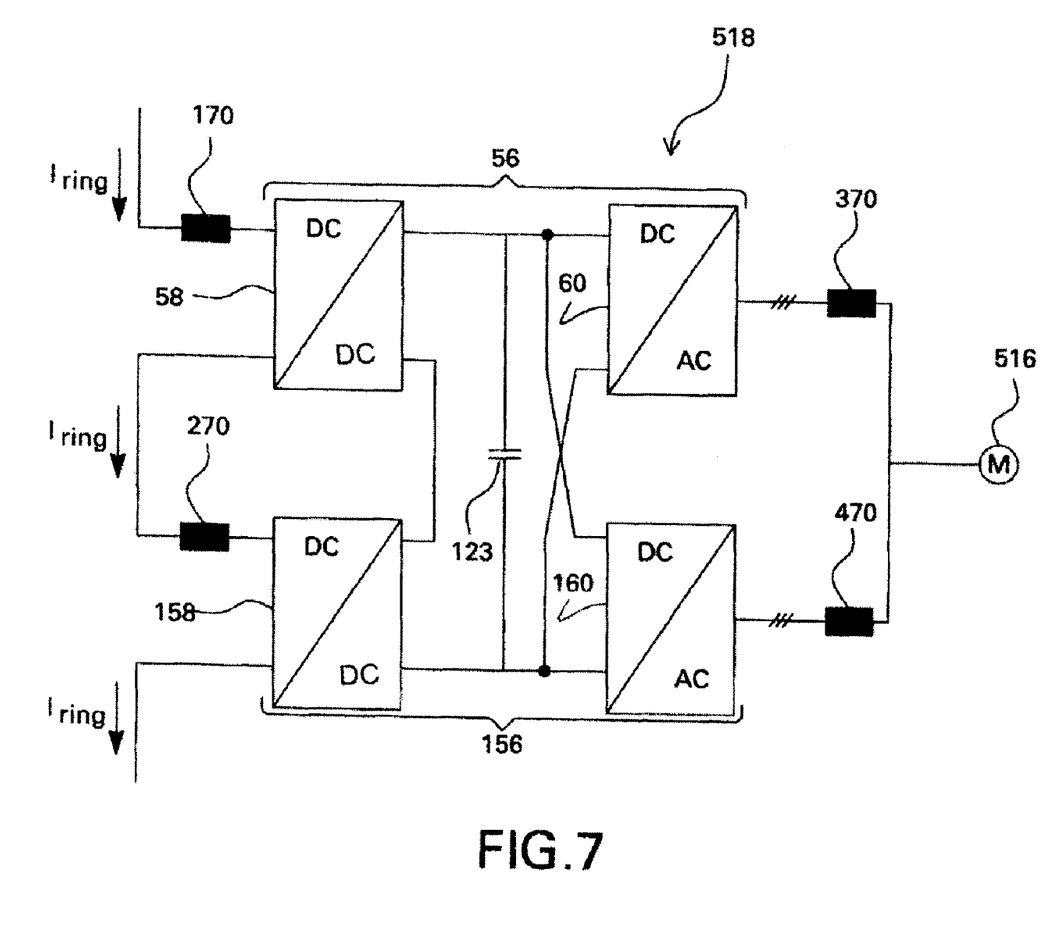
FIG. 7 is a block diagram of a modular redundancy embodiment.

FIG. 7 is a block diagram of an example of a modular redundancy embodiment wherein at least one power converter module 518 comprises at least two subconverter modules 56 and 156 between system DC link 123 and a respective load 516. Modular redundancy is one technique which may be used to increase system reliability. FIG. 7 additionally illustrates an embodiment wherein the two subconverter modules comprise at least two DC-to-DC converters 58 and 158 coupled in series across the module DC link, at least two DC-to-AC converters 60 and 160 coupled in parallel to the load, and a module DC link 123, coupling the series-coupled DC-to-DC converters to the parallel-coupled DC-to-AC converters. Although two DC-to-DC converters 58 and 158 and two DC-to-AC converters 60 and 160 are shown, additional converter may be coupled if increased redundancy is desired. Because the overall proposed system described herein requires less sub-sea space in a converter container as compared with conventional AC-to-AC conversion embodiments, is possible to use the same amount of space and include the subconverter module embodiments to build in higher redundancy than in conventional converter designs.

Embodiments providing such redundancy are useful to ensure that operation of load 516 may continue if a DC-to-DC converter fails (so long as at least one other DC-to-DC converter is still operational) or if a DC-to-AC converter fails (so long as at least one other DC-to-AC converter is still operational). In a similar manner as discussed with respect to FIGS. 2 and 5, upon a converter fault, for DC-to-DC converter faults the faulted converter may be short circuited or for DC-to-AC converter faults the faulted converter may be switched off.

FIG. 7 additionally illustrates inductors 170, 270, 370, and 470 which may comprise either discrete elements or be present as a natural inductance in the lines and, as discussed above, are also typically present (but not shown) in the embodiment of FIG. 2. When used in combination with the DC-to-DC converters, the inductors reduce the harmonic content of the voltage in the system DC link which is caused by switching the DC-to-DC converters. DC-to-AC converters having inductors coupled thereto may optionally be operated in an interleaved mode in order to improve the quality of the current being supplied to the load.

Bypassing of a subconverter module or a load may be accomplished with or without system interruption. If a single module is experiencing a DC link fault, module DC link 23 may be short circuited by adjusting the half bridge switches, and the voltage will be redistributed across other module DC links. When redundant subconverter modules are positioned in parallel and one is at fault, the other can supply current to the load while the faulted subconverter module is switched off. If a load is in a fault condition, a circuit breaker associated with the load may be tripped.

In one embodiment, the source side of transmission and distribution system 10 comprises source-side AC-to-DC power converter modules 42, 142, 242, and 342 coupled in series to system DC link 12. Although there are efficiency benefits to the illustrated embodiment, it is an optional embodiment and any appropriate source-side configuration may be used to supply DC power to the system DC link with one example being a current controlled thyristor converter configuration (shown in FIG. 8).

In one more specific embodiment of FIG. 1, each of the source power converter modules comprises a phase-shifting transformer 44 and an inverter 46 coupled between the phase-shifting transformer and system DC link 12. In another more specific embodiment, a controller 140 (which is typically separate from controller 40 but may optionally be part of controller 40) is provided for controlling switching in an inverter 46 of a source power converter module in response to a phase shift of a respective transformer 44. Phase shifting embodiments are described in commonly assigned U.S. patent application Ser. Nos. 11/010,147 and 11/095,227 and can be useful for improving power quality and enabling redundant modes of operation.

Half bridges 48 may additionally be present in the source power converter modules to enhance bypass capability. Half bridges on the source side may be used to control the current in the system DC link. Thus the source power converter modules may comprise standard voltage source converter modules delivering a constant DC voltage. In the example of FIG. 1, a combination of half-bridges 48 and bypass switches 54 are used. Because full voltage control is not as important on the source side, simplification of the modules may be used to reduce cost of the transmission and distribution system.

The cables on system DC link 12 may comprise any appropriate material which does not degrade when subject to DC voltages. Several examples include ethylene propylene rubber AC cables and polymer DC cables. In one specific example intended to enable redundancy, two three phase AC cables are used. In an alternative more specific example, six parallel DC cables are used. Cable housings of DC system link 12 are represented by element 15 of FIG. 1. These embodiments are for purposes of example, and other numbers of cables may be used.

The ring formed by system DC link 12 and the series connections in the example of FIG. 1 is grounded through an impedance 50 in order to avoid interruptions from pole-to-earth faults. Ideally impedance 50 will be of sufficient magnitude to provide insulation for the voltage difference across the system DC link. In an example wherein a top line of the system DC link is set at +12 kilovolts and negative line is set at −12 kilovolts, the impedance is set to provide insulation for up to 24 kilovolts.

When a cable carries single pole currents, bipolar faults are a low probability. If a problematic pole-to-earth fault occurs, it can be isolated. In one embodiment, the cable of DC power link 12 comprises parallel cables with enough current-carrying capacity to enable the disconnection of a faulted cable core without required interruptions. In this embodiment, if a pole-to-earth fault occurs, the load interrupters 52, 152, 252, 352, 452, 552, 652, 752, 852, 952 which are installed at the input and output of each single cable section, are switched in sequence until the fault is eliminated. In one example wherein there are six parallel switches at the input and output of each sub-sea cable section, sequential switching means that one sub-cable after another is switched off (by simultaneously switching off the input and output switches of a sub-cable). Thus, each sub-cable is for a short time completely separated from the power system (while the other sub-cables still carry the ring current). If there is an earth fault in one of the sub-cables, it will disappear when this sub cable is completely switched off. Subsequently switching off one sub-cable after another in all cable sections enables the elimination of an earth fault while the system can stay in operation.

One advantage of the embodiments disclosed herein is the flexibility that is provided by stringing the power converter modules in series. In one embodiment, a DC transmission and distribution method comprises providing a system DC link 12 configured for carrying power from a source 14 to a load 16, and coupling at least two DC to alternating current (AC) power converter modules 18, 118, 218, and 418 in series to system DC link 12 on a load side of the system DC link. In one embodiment, the method further includes driving a current of the system DC link towards a commanded value in a manner similar to that discussed above. In another embodiment, the method may further comprise later coupling at least one additional DC to AC power converter module 318 in series to the originally-coupled DC to AC power converter modules or decoupling at least one of originally-coupled DC to AC power converter modules (with the "or" meaning either or both). If power source 14 has the capacity to supply enough power for the additional load 316 off additional power converter module 318, this coupling method reduces the capital investment in supplying power to load 316.

Figure 8:
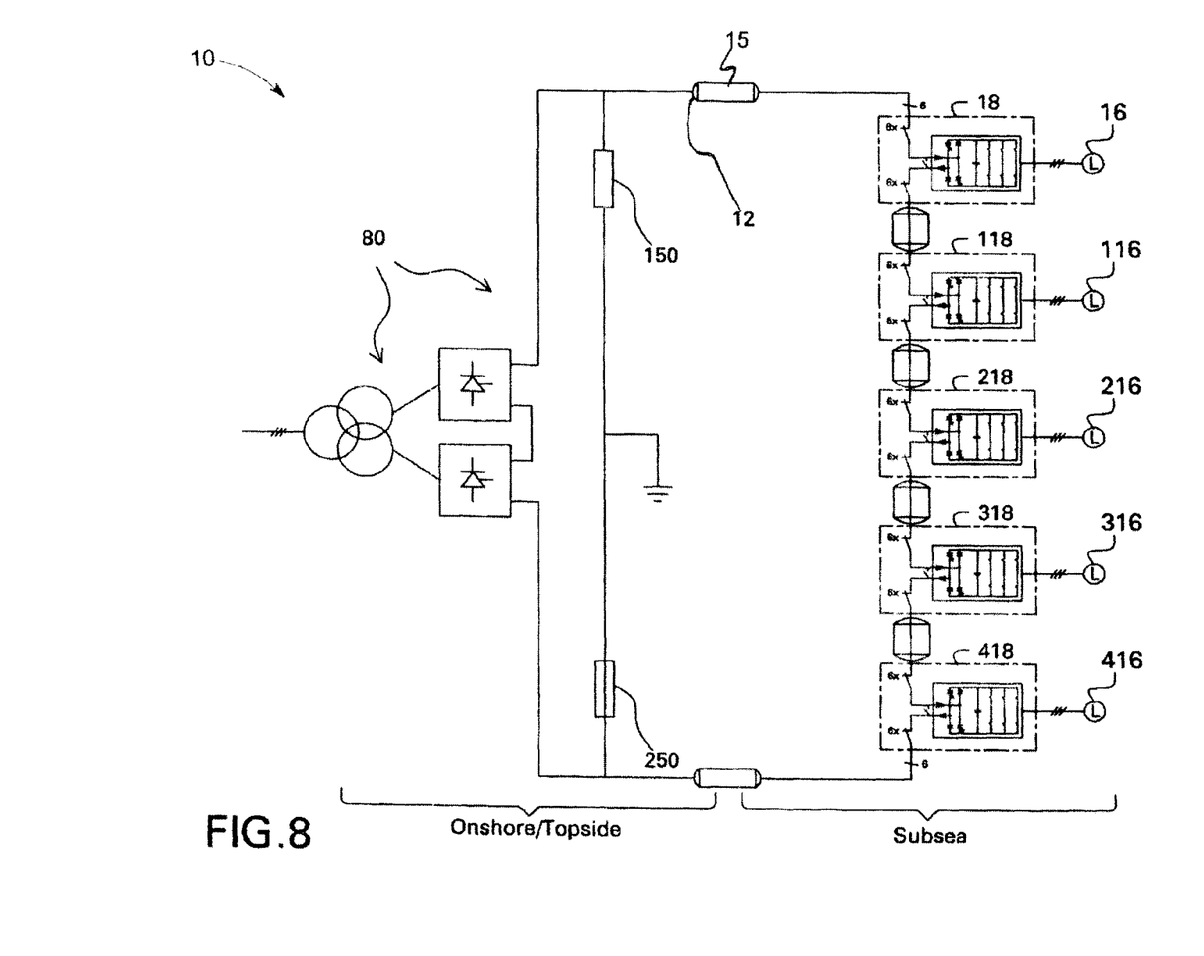
FIG. 8 is a block diagram of another transmission and distribution system embodiment disclosed herein.

FIG. 8 is a block diagram of another system embodiment disclosed herein wherein the source side of transmission and distribution system 10 comprises a thyristor converter 80 configuration. This embodiment is convenient because thyristor converters are the most widespread and least expensive drive system configurations for on shore installations with high nominal power. Additionally, thyristor converters are commonly used as current source converters where the current is controlled to be constant, e.g. in load commutated inverter (LCI) topologies.

Figure 9:
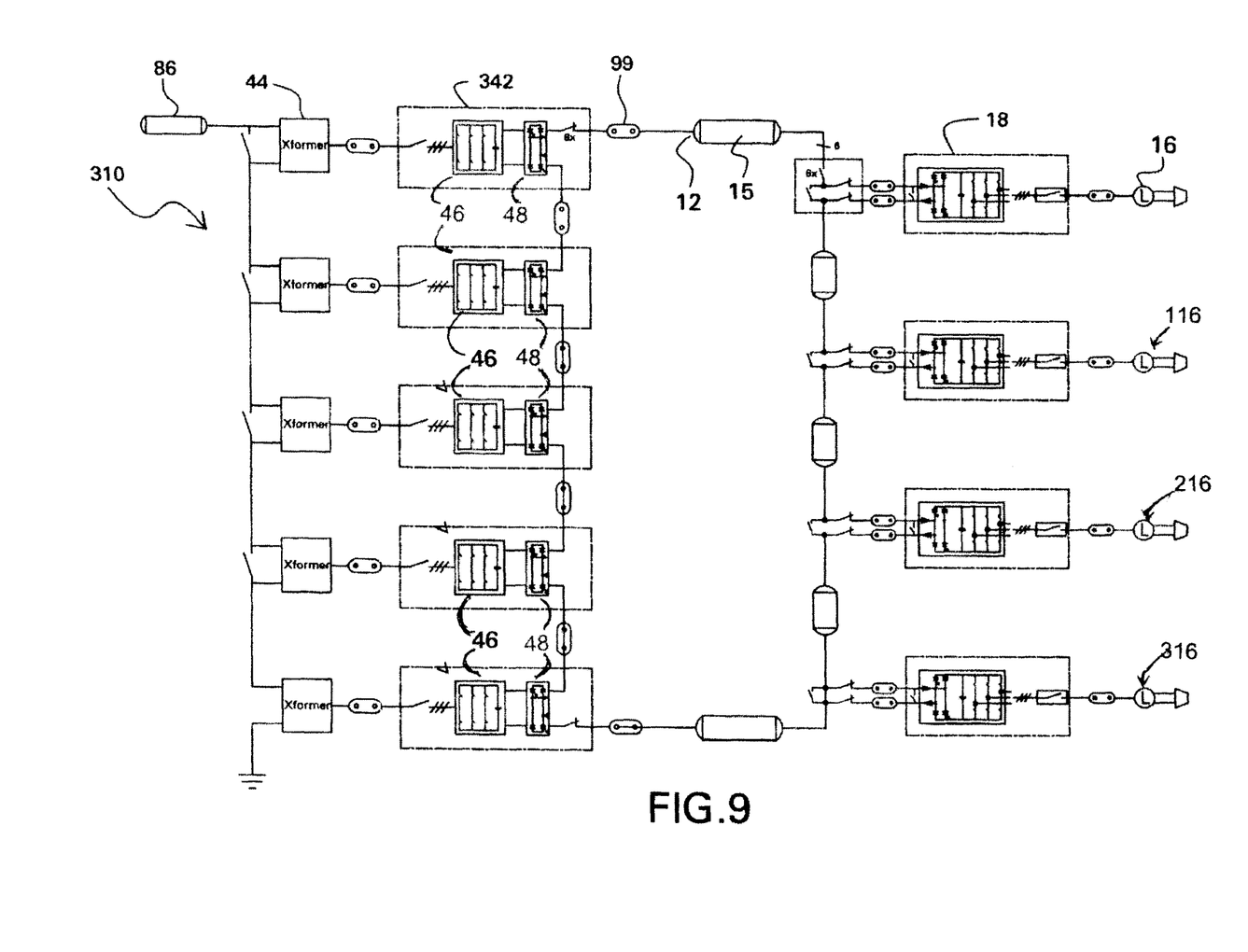
FIG. 9 is a block diagram of another transmission and distribution system embodiment disclosed herein.

FIG. 9 is a block diagram of another transmission and distribution system 310 embodiment disclosed herein wherein source AC-to-DC converter modules 342 are situated off-shore. In the illustrated embodiment of FIG. 9, a AC transmission line 86 is used to supply power to DC transmission and distribution system 310. The AC transmission line 86 will be situated sub-sea, and the converter modules may be situated either sub-sea or on a distribution platform (not shown). This embodiment is particularly useful when sub-sea loads 16 are situated far off shore and a higher voltage is desired for transmitting the power to a medium voltage DC transmission and distribution system 310. In one example, "far off" is defined as greater than or equal to 150 kilometers. In another example, "far off" is defined as greater than or equal to fifty kilometers. In these embodiments, it is expected that some of the aforementioned capacitance effects may be reduced by lowering the transmission frequency from the conventional fifty hertz or sixty hertz frequencies. In one embodiment, for example, the AC transmission voltage is 120 kilovolts and the frequency is twenty hertz.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A direct current (DC) power transmission and distribution system comprising:
    a system DC link configured for carrying power from a source to a plurality of loads, at least some of the plurality of loads being situated sub-sea; and
    DC to alternating current (AC) power converter modules coupled in series to the system DC link on a load side of the system DC link;
    wherein atleast one power converter module is configured to short circuit the terminals of the power, converter module and de-couple the power converter module from the DC link in an event of fault upon receipt of a respective command signal.

2. The system of claim 1 wherein the power converter modules comprise three phase power converters, and the power converters further comprise two level converters, three level converters, or a combination of two level converters and three level converters.

3. The system of claim 1 wherein each converter module comprises an inverter and a DC-to-DC converter coupled between the system DC link and the inverter.

4. The system of claim 1 wherein each power converter module is configured to independently remain in operation when another of the power converter modules is in a short circuit condition.

5. The system of claim 1 wherein at least some of the converter modules comprise an inverter and a half bridge coupled between the system DC link and the inverter.

6. The system of claim 5 wherein at least one half bridge comprises two diode-switch pairs, a terminal configured for receiving input power and supplying the input power to the inverter through a diode of the diode-switch pairs when both of the switches of the diode-switch pairs are open.

7. The system of claim 6 further comprising a controller configured for closing at least one of the switches in the event of a fault condition.

8. The system of claim 7 wherein at least one power converter module is coupled to a load comprising a motor and wherein the controller is configured to control electromagnetic braking of the motor by closing both of the switches.

9. The system of claim 1 wherein at least one power converter module comprises at least two subconverter modules.

10. The system of claim 9 wherein the two subconverter modules comprise at least two DC-to-DC converters coupled in series across the system DC link, at least two DC-to-AC converters coupled in parallel to the load, and a module DC link coupling the series-coupled DC-to-DC converters to the parallel-coupled DC-to-AC converters.

11. The system of claim 1 wherein the power converter modules comprise load power converter modules and further comprising source AC-to-DC power converter modules coupled in series to the system DC link on a source side of the system DC link.

12. The system of claim 11 wherein the source AC-to-DC converter modules are situated off-shore.

13. The system of claim 1 wherein the system DC link is coupled to the DC-to-AC power converter modules without wet-mateable connections.

14. The system of claim 13 further comprising a housing enclosing at least one DC-to-AC power converter module, wherein the housing is configured for being raised above sea to enable connections to be made above sea.

15. A direct current (DC) power transmission and distribution system comprising:
a system DC link configured for carrying power from a source to a load;
DC to alternating current (AC) power converter modules coupled in series to the system DC link on a load side of the system DC link; and
a controller for driving a current of the system DC link toward a commanded value, wherein atleast one power converter module is configured to short circuit the terminals of the power converter module and de-couple the power converter module from the DC link in an event of fault upon receipt of a respective command signal.

16. The system of claim 15 wherein a voltage of the system DC link is variable from zero to a nominal DC link voltage.

17. The system of claim 15 wherein the nominal voltage is less than or equal to plus or minus about thirty kilovolts.

18. The system of claim 15 wherein each converter module comprises an inverter and a DC-to-DC converter coupled between the system DC link and the inverter, wherein each power converter module is configured to short circuit the DC terminals of the power converter module upon receipt of a respective command signal, and wherein each power converter module is configured to independently remain in operation when another of the power converter modules is in a short circuit condition.

19. The system of claim 15 wherein at least some of the converter modules comprise an inverter and a half bridge coupled between the system DC link and the inverter.

20. The system of claim 19 further comprising another controller, wherein at least one power converter module is coupled to a load comprising a motor and wherein the other controller is configured to control electromagnetic braking of the motor by closing switches of the respective half bridge.

21. The system of claim 15 wherein at least one power converter module comprises at least two subconverter modules, and wherein the two subconverter modules comprise at least two DC-to-DC converters coupled in series across the system DC link, at least two DC-to-AC converters coupled in parallel to the load, and a module DC link coupling the series-coupled DC-to-DC converters to the parallel-coupled DC-to-AC converters.

22. A direct current (DC) power transmission and distribution method comprising:
providing a system DC link configured for carrying power from a source to a load;
coupling at least two DC to alternating current (AC) power converter modules in series to the system DC link on a load side of the system DC link;
driving a current of the system DC link towards a commanded value; and
de-coupling atleast one power converter module from the DC link in an event of fault by short circuiting the terminals of the power converter module on receipt of a respective command signal.

23. The method of claim 22 further comprising later coupling at least one additional DC to AC power converter module in series to the originally-coupled DC to AC power converter modules.

24. The method of claim 23 wherein the load comprises a plurality of sub-sea loads.

25. The method of claim 23 wherein the load comprises at least one motor and further comprising controlling electromagnetic braking of the motor by adjusting switches of a respective power converter module.

26. The method of claim 22 wherein a voltage of the system DC link is variable from zero to a nominal DC link voltage.

27. The method of claim 26 wherein the nominal voltage is less than or equal to plus or minus about thirty kilovolts.

28. A direct current (DC) power transmission and distribution method comprising:
providing a system DC link configured for carrying power from a source to a load;
coupling at least two DC to alternating current (AC) power converter modules in series to the system DC link on a load side of the system DC link; and
later coupling at least one additional DC to AC power converter module in series to the originally-coupled DC to AC power converter modules or decoupling at least one of originally-coupled DC to AC power converter modules.

29. The method of claim 28 wherein the load comprises a plurality of sub-sea loads.

30. The method of claim 29 wherein coupling is performed without wet-mateable connections.

* * * * *